United States Patent
Xin et al.

(10) Patent No.: US 11,418,377 B2
(45) Date of Patent: Aug. 16, 2022

(54) SENDING AND RECEIVING OF ORTHOGONAL FREQUENCY MULTIPLEXING USING AN EXTENDED SEQUENCE

(71) Applicant: ZTE CORPORATION, Guangdong (CN)

(72) Inventors: Yu Xin, Guangdong (CN); Luanjian Bian, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 37 days.

(21) Appl. No.: 16/768,220

(22) PCT Filed: Jul. 31, 2018

(86) PCT No.: PCT/CN2018/097813
§ 371 (c)(1),
(2) Date: May 29, 2020

(87) PCT Pub. No.: WO2019/105053
PCT Pub. Date: Jun. 6, 2019

(65) Prior Publication Data
US 2020/0287765 A1 Sep. 10, 2020

(30) Foreign Application Priority Data
Dec. 1, 2017 (CN) .......................... 201711250071.7

(51) Int. Cl.
*H04L 27/26* (2006.01)
*H04L 5/00* (2006.01)
(Continued)

(52) U.S. Cl.
CPC .......... *H04L 27/2613* (2013.01); *H04L 5/001* (2013.01); *H04L 5/0048* (2013.01); *H04L 5/12* (2013.01); *H04W 72/0453* (2013.01)

(58) Field of Classification Search
CPC ... H04L 27/26; H04L 5/0007; H04L 27/2613; H04L 29/06; H04L 5/001; H04L 5/0044;
(Continued)

(56) References Cited

U.S. PATENT DOCUMENTS

2009/0003484 A1* 1/2009 Li ....................... H04L 25/4902
375/271
2009/0135925 A1* 5/2009 Hamaguchi ......... H04L 25/0204
375/260
(Continued)

FOREIGN PATENT DOCUMENTS

CN 101313502 A 11/2008
CN 102916783 A 2/2013
(Continued)

OTHER PUBLICATIONS

English translation of WO 2017/186175 (Year: 2017).*
(Continued)

*Primary Examiner* — Ian N Moore
*Assistant Examiner* — Sun Jong Kim
(74) *Attorney, Agent, or Firm* — KDB Firm PLLC (57) ABSTRACT

Disclosed are a data sending and receiving method, apparatus, and device, and a computer readable storage medium. The method includes: when a first transmission frequency band sends data by adopting an extended sequence modulation data sending rule, data to be transmitted on spaced sub-carriers of the first transmission frequency band is respectively multiplied by each extended element in an extended sequence with a length of 2K to obtain extended data with a number of 2K, where there is another extended element with a phase difference of $\pi$ relative to each extended element in the extended sequence; and the
(Continued)

Multiply data to be transmitted on spaced sub-carriers of the first transmission frequency band respectively by each extended element in an extended sequence with a length of 2K to obtain extended data with a number of 2K — S101

Send the extended data with the number of 2K on 2K spaced sub-carriers of the first transmission frequency band — S102 extended data with the number of 2K is sent on 2K spaced sub-carriers of the first transmission frequency band, where K is a positive integer.

10 Claims, 5 Drawing Sheets (51) Int. Cl.
    *H04L 5/12*     (2006.01)
    *H04W 72/04*     (2009.01)

(58) Field of Classification Search
    CPC ......... H04L 5/0048; H04L 5/12; H04L 5/026; H04B 1/707; H04W 72/0453; H04J 13/105
    See application file for complete search history.

(56) References Cited

U.S. PATENT DOCUMENTS

| | | | |
|---|---|---|---|
| 2010/0303131 A1 | 12/2010 | Trachewsky | |
| 2011/0286537 A1* | 11/2011 | Stewart | H04L 5/0048 375/259 |
| 2012/0039158 A1* | 2/2012 | Cheng | H04B 7/0671 370/203 |
| 2018/0048435 A1* | 2/2018 | Islam | H04L 5/0007 |
| 2020/0213951 A1* | 7/2020 | Yang | H04L 1/06 |

FOREIGN PATENT DOCUMENTS

| | | |
|---|---|---|
| CN | 104796377 A | 7/2015 |
| CN | 105515713 A | 4/2016 |
| CN | 107925416 A | 4/2018 |
| WO | 2017010623 A1 | 1/2017 |
| WO | 2017078607 A1 | 5/2017 |
| WO | 2017186175 A1 | 11/2017 |
| WO | WO-2017186175 A1 * | 11/2017 ............ H04W 74/00 |

OTHER PUBLICATIONS

Office Action for Chinese Application No. 2017112500717, dated Feb. 26, 2021, 6 pages.
Search Report for Chinese Application No. 2017112500717, dated Feb. 26, 2021, 3 pages.
International Search Report for the International Patent Application No. PCT/CN2018/097813, dated Oct. 23, 2018, 2 pages.
European Search Report and Written Opinion for the European Patent Application No. EP18884519, dated Jul. 7, 2021, 8 pages.

* cited by examiner

SENDING AND RECEIVING OF ORTHOGONAL FREQUENCY MULTIPLEXING USING AN EXTENDED SEQUENCE

CROSS-REFERENCE TO RELATED APPLICATIONS

This is a National Stage Application, filed under 35 U.S.C. 371, of International Patent Application No. PCT/CN2018/097813, filed on Jul. 31, 2018, which claims priority to Chinese patent application No. 201711250071.7 filed on Dec. 1, 2017, contents of both of which are incorporated herein by reference in its entirety.

TECHNICAL FIELD

The present disclosure relates to, but is not limited to, the field of communications.

BACKGROUND

Orthogonal frequency division multiplexing (OFDM) technology is introduced in a fourth generation (4G) wireless cellular communication, and continues to be used in a fifth generation (5G) wireless cellular communication. A main idea of OFDM technology is to use characteristics that sub-carriers are orthogonal to each other and do not interfere with each other, meanwhile, multiple data transmissions are completed by multiple sub-carriers, so that spectrum efficiency is improved and spectrum resources are saved.

However, when sub-carriers of two transmission frequency bands are not orthogonal to each other, for example, when sub-carriers of two transmission frequency bands are not orthogonal to each other due to the fact that the sub-carriers of two adjacent transmission frequency bands have different frequency spacing configurations, or a frequency offset exists between the two adjacent transmission frequency bands, and so on. When one transmission frequency band performs a data transmission, which will cause interference with other adjacent transmission frequency band, in other words, an out-of-band leakage of two adjacent transmission frequency bands will cause these two adjacent transmission frequency bands to interfere with each other, i.e., for any one of the transmission frequency bands, a signal transmitted by the other transmission frequency band becomes an interference signal of this transmission frequency band, thereby influencing the transmission performance of the transmission frequency bands.

SUMMARY

The present disclosure provides a data sending and receiving method, apparatus, and device, and a computer readable storage medium.

The present disclosure provides a data sending method. The data sending method includes steps described below.

When a first transmission frequency band sends data by adopting an extended sequence modulation data sending rule, data to be transmitted on spaced sub-carriers of the first transmission frequency band is multiplied respectively by each extended element in an extended sequence with a length of 2K to obtain extended data with a number of 2K, where there is another extended element with a phase difference of $\pi$ relative to each extended element in the extended sequence; and the extended data with the number of 2K is sent on 2K spaced sub-carriers of the first transmission frequency band, and K is a positive integer.

The present disclosure provides a data receiving method. The data receiving method includes steps described below.

Data sent by a first transmission frequency band through the data sending method described above is received; extended data with the number of 2K on the 2K spaced sub-carriers of the first transmission frequency band is extracted; and the extracted and extended data with the number of 2K is divided respectively by corresponding extended elements in the extended sequence with the length of 2K.

The present disclosure provides a data sending method. The data sending method includes steps described below.

When a transmission frequency band sends data by adopting an extended sequence modulation data sending rule, data to be transmitted on the transmission frequency band is multiplied respectively by each extended element in an extended sequence with a length of 2K to obtain extended data with a number of 2K, where there is another extended element with a phase difference of $\pi$ relative to each extended element in the extended sequence; and the extended data with the number of 2K is sent on 2K consecutive sub-carriers of the transmission frequency band, and K is a positive integer greater than 1.

The present disclosure provides a data sending apparatus. The data sending apparatus includes a data modulation module and a data transfer module.

The data modulation module is configured to, when a first transmission frequency band sends data by adopting an extended sequence modulation data sending rule, multiply data to be transmitted on spaced sub-carriers of the first transmission frequency band respectively by each extended element in an extended sequence with a length of 2K to obtain extended data with a number of 2K, where there is another extended element with a phase difference of $\pi$ relative to each extended element in the extended sequence. The data transfer module is configured to send the extended data with the number of 2K on 2K spaced sub-carriers of the first transmission frequency band, and K is a positive integer.

The present disclosure provides a data receiving apparatus. The data receiving apparatus includes a data receiving module and a data demodulation module.

The data receiving module is configured to receive data sent by a first transmission frequency band through the data sending method described above and extract extended data with the number of 2K on the 2K spaced sub-carriers of the first transmission frequency band. The data demodulation module is configured to divide the extracted and extended data with the number of 2K respectively by corresponding extended elements in the extended sequence with the length of 2K.

The present disclosure provides a data sending device. The data sending device includes a processor, a memory and a communication bus. The communication bus is configured to implement a connection communication between the processor and the memory, and the processor is configured to execute a data sending program stored in the memory to implement steps of the data sending method described above.

The present disclosure provides a computer readable storage medium. The computer readable storage medium is configured to store a data sending program, which is executable by at least one processor to implement steps of the data sending method described above; or, the computer readable storage medium is configured to store a data receiving program, which is executable by at least one processor to implement steps of the data receiving method described above.

The beneficial effects of the present disclosure are as follows.

The data sending and receiving method, apparatus, and device, and the computer readable storage medium provided by the embodiments of the present disclosure are aimed at that two transmission frequency bands interfere with each other and influence respective transmission performance of each other in a data transmission process due to the fact that the sub-carriers are not orthogonal to each other, and following manners are used: the data to be transmitted on the spaced sub-carriers of the first transmission frequency band is multiplied respectively by each extended element in the extended sequence with the length of 2K to obtain the extended data with the number of 2K, and then the extended data with the number of 2K is sent on the 2K spaced sub-carriers of the first transmission frequency band; or the data to be transmitted on the second transmission frequency band with the larger sub-carrier spacing is multiplied by each extended element in the extended sequence with the length of 2K respectively to obtain the extended data with the number of 2K, and then the extended data with the number of 2K is sent on the 2K consecutive sub-carriers, and K is a positive integer, and there is another extended element with the phase difference of $\pi$ relative to each extended element in the extended sequence. Compared with the existing single-carrier transmission manner, side lobe amplitudes between sub-carrier signals using the extended sequence may be greatly cancelled, so that the out-of-band leakage is suppressed, the interference between transmission frequency bands is reduced, and particularly interference of an adjacent transmission frequency band is reduced.

In addition, in the present disclosure, one piece of data to be transmitted may be extended into a data sequence including at least two pieces of data and sent on at least two sub-carriers. Therefore, same data to be transmitted is repeatedly sent under the action of the extended sequence, and in comparison with the existing single-carrier transmission manner of data transmission, the received signal-to-noise ratio of data to be transmitted is increased, and the demodulation performance is improved.

Other features and corresponding beneficial effects of the present disclosure are explained in later sections of the description, and it should be understood that at least part of the beneficial effects will become apparent from the description of the present disclosure.

DETAILED DESCRIPTION

In order to make the objects, technical schemes and advantages of the present disclosure clearer, the embodiments of the present disclosure will be further described in detail below through specific implementations in conjunction with the accompanying drawings. It should be understood that the specific embodiments described herein are merely intended to explain the present disclosure and not intended to limit the present disclosure.

Embodiment One

In order to solve that when sub-carriers of two adjacent transmission frequency bands (referred to as a first transmission frequency band A and a second transmission frequency band B respectively in this embodiment) are non-orthogonal (caused by factors, such as, but not limited to, different sub-carrier frequency spacing configurations or a frequency offset between the two adjacent transmission frequency bands), since the sub-carriers of these two transmission frequency bands are not orthogonal, which will cause an out-of-band leakage, so the two transmission frequency bands interfere with each other, and thus the transmission performance is influenced, the present embodiment provides a data sending method, which may be applied to a data sending device as a sending end. It should be understood that the data sending device in this embodiment includes, but is not limited to, a base station, a terminal, a relay and a transmitting point. For ease of understanding, this embodiment is exemplified by a specific application scenario.

Figure 1:
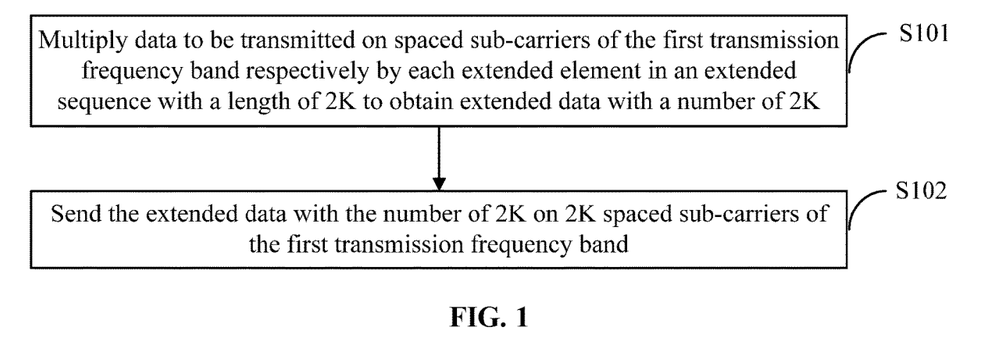
FIG. 1 is a flowchart of a data sending method of a first transmission frequency band according to embodiment one of the present disclosure.

In the view of the above descriptions, in this embodiment, the first transmission frequency band may send data by adopting an extended sequence modulation data sending rule. This data sending process is shown in FIG. 1, and may include steps described below.

S101, data to be transmitted on spaced sub-carriers of the first transmission frequency band is multiplied respectively by each extended element in an extended sequence with a length of 2K to obtain extended data with a number of 2K, where K is a positive integer.

There is another extended element with a phase difference of $\pi$ relative to each extended element in the extended sequence of this embodiment.

S102, the extended data with the number of 2K is sent on 2K spaced sub-carriers of the first transmission frequency band.

In this embodiment, it is assumed that a frequency spacing of adjacent sub-carriers of each sub-carrier (A1, A2, A3, ... etc.) of the first transmission frequency band A is $C_A$, a frequency spacing of adjacent sub-carriers of each sub-carrier (B1, B2, B3, ... etc.) of the second transmission frequency band B is $C_B$, and a frequency spacing between the two transmission frequency bands, i.e., the first transmission frequency band A and the second transmission frequency band B is C.

In this embodiment, when a relationship between the sub-carrier spacing $C_A$ of the first transmission frequency band and the sub-carrier $C_B$ of the second transmission frequency band satisfies a following formula: $C_B = m \cdot C_A$, and m is a positive integer, the first transmission frequency band may send the data by adopting the extended sequence modulation data sending rule as shown in FIG. 1. At this time, before the first transmission frequency band sends the data by adopting the extended sequence modulation data sending rule, the method further includes a step described below. It is determined whether the first transmission frequency band sends the data by adopting the extended sequence modulation data sending rule.

This step includes that whether the relationship between the sub-carrier spacing $C_A$ of the first transmission frequency band and the sub-carrier $C_B$ of the second transmission frequency band satisfies the following formula: $C_B = m \cdot C_A$, and if yes, it is determined that the first transmission frequency band sends the data by adopting the extended sequence modulation data sending rule.

Of course, it should be understood that, according to an actual application scenario, a trigger condition that the first transmission frequency band sends the data by adopting the extended sequence modulation data sending rule as shown in FIG. 1 may be flexibly set, which is not limited to the condition of $C_B = m \cdot C_A$ in the above example.

It should be understood that, in this embodiment, when the relationship between the sub-carrier spacing $C_A$ of the first transmission frequency band and the sub-carrier $C_B$ of the second transmission frequency band satisfies the following formula: $C_B = m \cdot C_A$, the first transmission frequency band and the second transmission frequency band may also selectively adopt the extended sequence modulation data sending rule to send the data, specifically, it may include that the first transmission frequency band adopts the extended sequence modulation data sending rule, and the second transmission frequency band does not adopt the extended sequence modulation data sending rule; or, the second transmission frequency band adopts the extended sequence modulation data sending rule, and the first transmission frequency band does not adopt the extended sequence modulation data sending rule; or both the first transmission frequency band and the second transmission frequency band adopt the extended sequence modulation data sending rule. It should be understood that which frequency bands adopting this rule may be flexibly set according to a specific application scenario.

Figure 2:
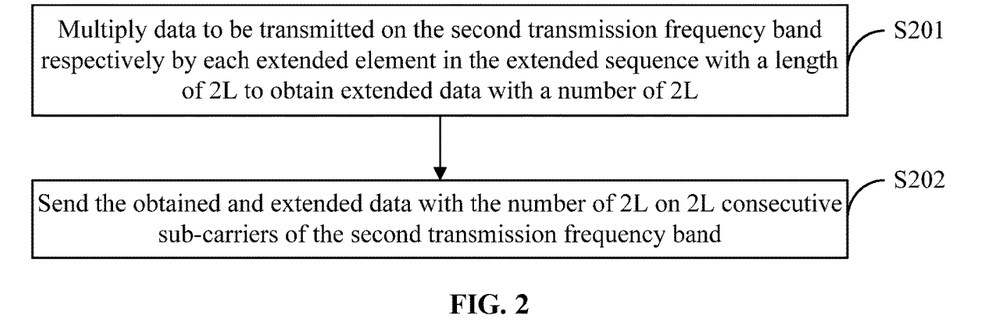
FIG. 2 is a flowchart of a data sending method of a second transmission frequency band according to the embodiment one of the present disclosure.

For example, if the second transmission frequency band sends the data by adopting the extended sequence modulation data sending rule, a process of sending the data is shown in FIG. 2, and may include steps described below.

S201, data to be transmitted on the second transmission frequency band is multiplied respectively by each extended element in the extended sequence with a length of 2L to obtain extended data with a number of 2L, where L is a positive integer, and a value of L may be equal to or not equal to the K described above.

There is another extended element with a phase difference of $\pi$ relative to each extended element in the extended sequence of this embodiment.

S202, the obtained and extended data with the number of 2L is sent on 2L consecutive sub-carriers of the second transmission frequency band.

In this embodiment, a frequency spacing of adjacent sub-carriers is a frequency difference of peak values of two adjacent sub-carriers. For a transmission frequency band, a width of each sub-carrier in this transmission frequency band is identical and a frequency spacing configuration of adjacent sub-carriers in this transmission frequency band is also identical, so that the first transmission frequency band A has a uniform frequency spacing $C_A$ of adjacent sub-carriers. At the same time, the width of each sub-carrier in the first transmission frequency band A is equal to the frequency spacing $C_A$ of adjacent sub-carriers, therefore the sub-carriers are orthogonal to each other in the first transmission frequency band A. Also similar for the second transmission frequency band B, for example, the frequency spacing $C_B$ of adjacent sub-carriers in the second transmission frequency band B is 30 kHz, and a frequency width of each sub-carrier (B1, B2, B3, ... etc.) is also 30 kHz, therefore the sub-carriers are orthogonal to each other in the second transmission frequency band B.

In this embodiment, the frequency spacing C of two adjacent transmission frequency bands refers to a frequency spacing between two sub-carriers on an adjacent edge between the first transmission frequency band A and the second transmission frequency band B, for example, the first transmission frequency band A is adjacent to the second transmission frequency band B, and a frequency upper limit of the first transmission frequency band A is less than a frequency upper limit of the second transmission frequency band B. Each of the first transmission frequency band A and the second transmission frequency band B has 3 sub-carriers, namely A1, A2, A3, B1, B2 and B3 in a sequence from a low frequency to a high frequency, thus the frequency spacing between the first transmission frequency band A and the second transmission frequency band B is a frequency spacing between sub-carrier A3 and sub-carrier B1. It is assumed that the frequency spacing $C_A$ of adjacent sub-carriers of the first transmission frequency band A is less than the frequency spacing $C_B$ of adjacent sub-carriers of the first transmission frequency band A, the frequency spacing C between adjacent transmission frequency bands is equal to an integer multiple of $C_A$ under a normal condition. The "normal condition" mentioned here is a condition that a frequency offset is excluded, but if the frequency offset between the two adjacent transmission frequency bands exists, the frequency spacing C and $C_A$ will no longer satisfy the above relationship.

In this embodiment, the transmission frequency band is a section of frequency resources for transmitting data. The transmission frequency band includes N sub-carriers, and N is greater than or equal to 2. The first transmission frequency band and the second transmission frequency band may be two complete transmission broadbands, or two transmission sub-bands on one transmission broadband, or a part of frequency resources of a transmission sub-band, and so on.

In this embodiment, if it is monitored that when a relationship between the sub-carrier spacing $C_A$ of the first transmission frequency band and the sub-carrier $C_B$ of the second transmission frequency band satisfies the following formula: $C_B=m \cdot C_A$, and a value of m is a positive integer, the data sending method for these two adjacent transmission frequency bands may be flexibly adopt the above example method according to a specific scenario.

In this embodiment, for the transmission frequency band (which may be referred to as a target transmission frequency band in this embodiment) sending the data by adopting the extended sequence modulation data sending rule, an extended modulation is performed on the corresponding data to be transmitted thereof mainly to enable side lobe amplitudes of the sub-carriers to be cancelled with each other when sub-carriers in the target transmission frequency band send the obtained data to be sent with the number of 2K or 2L (which may be referred to as data sequences to be transmitted), so that interference on other transmission frequency bands caused by the out-of-band leakage is avoided. In other words, the extended modulation of the data sequences to be transmitted of the target transmission frequency band is actually to protect other transmission frequency bands adjacent to the target transmission frequency band. For ease of explanation, in this embodiment, a protected transmission frequency band is referred to as a "protected frequency band". For example, when the first transmission frequency band adopts the extended sequence modulation data sending rule, the first frequency band is the target transmission frequency band, and when the second transmission frequency band does not adopt the extended sequence modulation data sending rule, the second frequency band is the protected frequency band, and so on for other application situations.

It should be understood that the data to be transmitted in this embodiment may be digital modulation information, such as a binary phase shift keying (BPSK), a quadrature phase shift keying (QPSK), a quadrature amplitude modulation (QAM), or others, and may also be in other data formats.

In this embodiment, the extended sequence used for performing the extended modulation on the data to be transmitted includes 2K extended elements. It should be understood that when the extended sequence is adopted to perform the extended modulation on the data to be transmitted, other modulation manners are not excluded except the manner of multiplying this extended sequence by the data to be transmitted. As described above, the data sequence to be transmitted obtained by the extended modulation includes data to be transmitted with a number of 2K. Where, a value of K is a positive integer, and there is another extended element with the phase difference of $\pi$ relative to each extended element in the extended sequence.

In this embodiment, every two consecutive extended elements in the extended sequence are divided into a group. It is assumed that this group is referred to as a "suppression group", and two extended elements within one suppression group have a phase difference of $\pi$. And in this embodiment, adjacent extended elements between groups may have a phase difference of 0 or $\pi$. The extended sequence includes K suppression groups, where, a $1^{st}$ extended element and a $2^{nd}$ extended element belong to one suppression group, a $3^{rd}$ extended element and a $4^{th}$ extended element belong to one suppression group, . . . and so on, a $(2K-1)^{th}$ extended element and a $(2K)^{th}$ extended elements belong to one suppression group. In an example of this embodiment, two extended elements in a same suppression group have the phase difference of $\pi$. That is to say, the $1^{st}$ extended data and the $2^{nd}$ extended data have a phase difference of $\pi$, so that signal side lobes may be cancelled with each other on sub-carriers for transmitting the $1^{st}$ extended data and the $2^{nd}$ extended data, and signal side lobes may be cancelled with each other on sub-carrier for transmitting the $3^{rd}$ data and $4^{th}$ data, . . . it is assumed that the value of K is 1, the extended sequence includes 2 extended elements, that is, only one suppression group such as [P, −P] is included. In another example of this embodiment, the value of K is 2, the extended sequence includes [P, −P, −P, P], and the extended sequence includes two suppression groups, and side lobes of two sub-carrier signals corresponding to one group may be cancelled with each other, and at this time, adjacent extended elements between groups have the phase difference of 0. The extended sequence [P, −P, −P, P] has a better out-of-band leakage suppression effect than the extended sequence [P, −P]. In another example, the value of K is 2, and the extended sequence includes [P, −P, −P, P], this extended sequence still includes two suppression groups, side lobes of two sub-carrier signals corresponding to one group may be cancelled with each other, but at this point, adjacent extended elements between groups have the phase difference of $\pi$.

In addition, it should be understood that the specific value of the K in this embodiment may be flexibly set according to proposed transmission environment and requirements. In addition to the above-described 1 and 2, the value of K may also be 3 or 4, etc., P in the above examples is a complex number, and it should be understood that it may specifically be a real number or an imaginary number.

In the above examples, each extended element in the extended sequence has an equal absolute value, which is P. It should be understood that the absolute value of each extended element will influence an amplitude of a sub-carrier after the extended modulation is performed on the data to be transmitted. Therefore, in some other examples, in order to obtain a better out-of-band leakage suppression effect for the transmission, the absolute value of each extended element in the extended sequence may not be completely equal. For example, when the value of K is 1, two elements of the extended sequence may have opposite phases and unequal modulus values. When the value of K is 2, there may be extended elements with unequal modulus values in the extended sequence.

In this embodiment, when a first receiving end corresponding to the first transmission frequency band A receives data, a signal of the second transmission frequency band B will become an interference signal of the first transmission frequency band A, and the data is intercepted according to an OFDM symbol length of the first transmission frequency band A, at this time, an out-of-band leakage signal of the second transmission frequency band B will be received on the first transmission frequency band A (and vice versa, the first transmission frequency band A may be taken as the target transmission frequency band, while the second transmission frequency band B may be taken as the protected frequency band, or both the first transmission frequency band A and the second transmission frequency band B are taken as the target transmission frequency bands and the protected frequency bands). Therefore, in order to avoid a transmission of the second transmission frequency band B from interfering with the first receiving end, at this time, the first transmission frequency band A may be taken as the protected frequency band, while the second transmission frequency band B may be taken as the target transmission frequency band, after sending end performs the extended modulation on first data to be transmitted which needs to be transmitted on the second transmission frequency band B by adopting the extended sequence including the 2K extended elements, a first data sequence to be transmitted including the data with the number of 2K is obtained, and the data with the number of 2K is sent on 2K consecutive sub-carriers of the second transmission frequency band B. For example, when K is equal to 1, two pieces of data of the first data sequence to be transmitted are sent on $1^{st}$ and $2^{nd}$ sub-carriers of the second transmission frequency band B. When K has a value of 2, data with a number of 4 of the first data sequence to be transmitted are respectively sent on $1^{st}$ to $4^{th}$ sub-carriers of the second transmission frequency band B.

Figure 3:
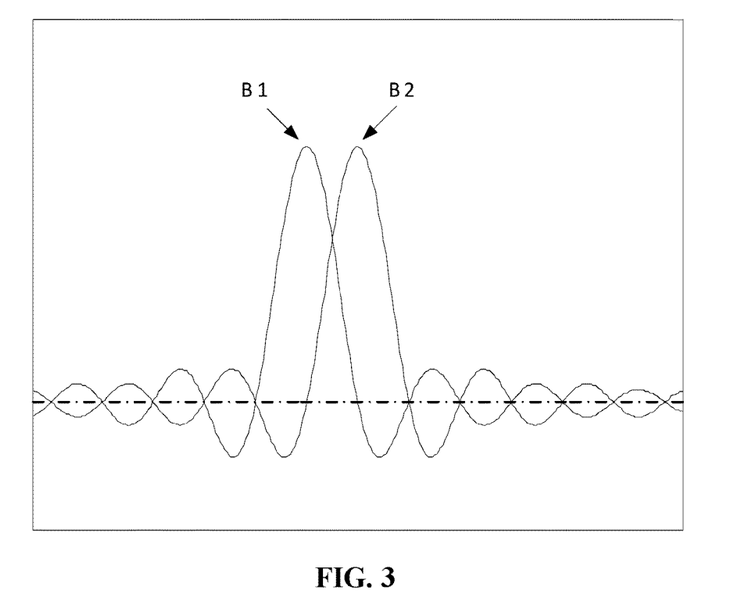
FIG. 3 is a schematic diagram of waveforms of two consecutive sub-carriers after the extended modulation is performed on the second transmission frequency band according to the embodiment one of the present disclosure.

Through this way, side lobe amplitudes between the sub-carriers in the second transmission frequency band B may be greatly cancelled, the out-of-band leakage may be suppressed, and the interference with the first transmission frequency band A may be reduced. Please refer to the schematic diagram of waveforms of two sub-carriers B1 and B2 within the second transmission frequency band B as shown in FIG. 3, where the horizontal axis direction characterizes frequency, and the vertical axis direction characterizes amplitude. It may be seen from FIG. 3 that the side lobe amplitudes of sub-carriers B1 and B2 may be greatly cancelled. Moreover, the second transmission frequency band B is under the action of the extended sequence, the sub-carrier B1 and the sub-carrier B2 repeatedly send data, so that the received signal-to-noise ratio of the second transmission frequency band B may be increased, and the demodulation performance is improved when the second transmission frequency band B demodulates data.

Of course, those skilled in the art should understand that in the above example, there is only one piece of first data to be transmitted, but that in practical applications, there may be multiple pieces of first data to be transmitted at the same time which need to be sent from the sending end to the first receiving end, for example, there is first data to be transmitted with a number of i at present, i.e., S1, S2, S3 . . . , Si, where i is an integer greater than 1. At this time, the sending end may multiply the data to be transmitted with the number of i respectively by the extended sequence on consecutive sub-carriers of the second transmission frequency band B to obtain i data sequences to be transmitted, where each data sequence to be transmitted includes extended data with a number of 2K. Then, the sending end sends the i data sequences to be transmitted respectively on i groups of consecutive sub-carriers successively using 2K consecutive sub-carriers as a group, as shown in FIG. 4.

Figure 4:
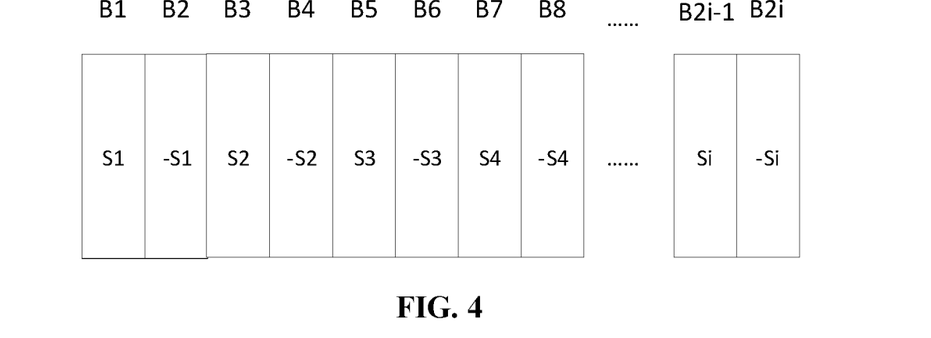
FIG. 4 is a schematic diagram of a first data sequence to be transmitted carried on each sub-carrier of the second transmission frequency band according to the embodiment one of the present disclosure.

In FIG. 4, the value of K is 1, and the extended sequence is [1, −1]. After the extended modulation is performed on $1^{st}$ first data to be transmitted S1 of the target transmission frequency band, a first data sequence to be transmitted [S1, −S1] is obtained, and these two pieces of data will be sent through two consecutive sub-carriers with serial numbers of B1 and B2 in the second transmission frequency band B; the first data sequence to be transmitted obtained after the extended modulation is performed on a second piece of data to be transmitted S2 is [S2, −S2], which will be sent through two consecutive sub-carriers with serial numbers of B3 and B4; by analogy, $i^{th}$ first data to be transmitted Si is extendedly modulated into [Si, −Si], which may be sent by using sub-carriers with serial numbers of B2i−1 and B2i.

When a second receiving end corresponding to the second transmission frequency band B receives data, a signal of the first transmission frequency band A will become an interference signal of the second transmission frequency band B, and the data is intercepted according to an OFDM symbol length of the second transmission frequency band B, at this time, a signal of the first transmission frequency band A is received on the second transmission frequency band B, and the frequency spacing of adjacent sub-carriers of the first transmission frequency band A is invariant, however, a sub-carrier width of the first transmission frequency band A is the same as a sub-carrier width of the second transmission frequency band B. In this case, a part of the sub-carriers of the first transmission frequency band A are not orthogonal to sub-carriers of the second transmission frequency band B, thereby interfering with the second transmission frequency band B. Therefore, in order to avoid a transmission of the first transmission frequency band A from interfering with the second receiving end, and at this time, the second transmission frequency band B may be taken as the protected frequency band, while the first transmission frequency band A is taken as the target transmission frequency band. For these sub-carriers causing the interference, the sending end performs the extended modulation on the second data to be transmitted corresponding to the sub-carriers by adopting the extended sequence including the 2K extended elements to obtain a second data sequence to be transmitted including data with a number of 2K, and the data with the number of 2K is sent on 2K spaced sub-carriers of the first transmission frequency band A.

In this embodiment, the 2K spaced sub-carriers are sub-carriers with an equal spacing. Sub-carriers spaced between adjacent spaced sub-carriers in the 2K spaced sub-carriers have a number of m−1 (that is, the frequency spacing is $C_B$). For example, when the sub-carrier spacing satisfies a following formula: $C_B=4C_A$, sub-carriers spaced between adjacent spaced sub-carriers have a number of 3; when the sub-carrier spacing satisfies a following formula: $C_B=2C_A$, sub-carriers spaced between adjacent spaced sub-carriers have a number of 1; when the sub-carrier spacing satisfies a following formula: $C_B=C_A$, sub-carriers spaced between adjacent spaced sub-carriers have a number of 0, and at this time, the spaced sub-carriers are consecutive sub-carriers.

In this embodiment, a frequency difference between the spaced sub-carriers of the first transmission frequency band A and sub-carriers of the second transmission frequency band B is not equal to an integer multiple of $C_B$.

In this embodiment, when no frequency offset exists between the first transmission frequency band A and the second transmission frequency band B, that is, $C=pC_A$, and p is a positive integer, some sub-carriers of the first transmission frequency band A have the frequency spacing with the sub-carriers of the second transmission frequency band B being just a positive integer multiple of $C_B$, and these sub-carriers are orthogonal to the sub-carriers in the second transmission frequency band B. Therefore, the transmission of these sub-carriers will not interfere with the transmission of the second transmission frequency band B. Therefore, these sub-carriers do not need to be subjected to side lobe amplitude cancellation. In this embodiment, a set of these sub-carriers orthogonal to the sub-carriers in the first transmission frequency band A is referred to as an "orthogonal sub-carrier set".

If no frequency offset exists between the second transmission frequency band B and the first transmission frequency band A, the sending end may select each sub-carrier from the first transmission frequency band A as a sub-carrier to be selected, each sub-carrier has the frequency spacing with the second transmission frequency band B satisfying a relationship of $n \cdot C_A C \neq q C_B$, and select sub-carriers having the frequency spacing of CB from these sub-carriers to be selected to form one or more spaced sub-carrier sets, where q is a positive integer, and n is a serial number of a sub-carrier in the first transmission frequency band A. It should be understood that a frequency spacing between any two adjacent sub-carriers in the spaced sub-carriers is $C_B$, that is, m−1 sub-carriers are spaced between two adjacent sub-carriers in a spaced sub-carrier set. From this, it may be seen that there are m−1 spaced sub-carrier sets in the first transmission frequency band A. For example, when $C_B=2C_A$, there is one spaced sub-carrier set in the first transmission frequency band A, it is assumed that sub-carriers with an odd serial number such as sub-carriers A1, A3, A5, etc. form the orthogonal sub-carrier set, then sub-carriers with an even serial number such as sub-carriers A2, A4, A6, etc. form the spaced sub-carrier set; when $C_B=4C_A$, there are 3 spaced sub-carrier sets in the first transmission frequency band A, it is assumed that sub-carriers A1, A5, A9, etc. form the orthogonal sub-carrier set, then sub-carriers A2, A6, A10, etc. form a first spaced sub-carrier set, sub-carriers A3, A7, A11, etc. form a second spaced sub-carrier set, and sub-carriers A4, A8, A12, etc. form a third spaced sub-carrier set.

For example, the sub-carrier spacing $C_B$ of the second transmission frequency band B is 30 kHz, the sub-carrier spacing $C_A$ of the first transmission frequency band A is 15 kHz, and the frequency spacing C between the second transmission frequency band B and the first transmission frequency band A is equal to 30 kHz. In this case, in the first transmission frequency band A, it is assumed that the serial number of a sub-carrier starts from 1, then sub-carriers with an even serial number are not orthogonal to the sub-carriers in the second transmission frequency band B, while sub-carriers with an odd serial number are orthogonal to each sub-carrier in the second transmission frequency band B. Therefore, the sending end may adopt data modulated by an extended sequence on the sub-carriers with the even serial number such as A2, A4, A6, etc.

Since the sub-carriers in the first transmission frequency band A having the frequency spacing with the sub-carriers in the second transmission frequency band B satisfying the relationship of $n \cdot C_A C \neq q C_B$ are just orthogonal to the sub-carriers in the second transmission frequency band B, therefore a set of these sub-carriers orthogonal to each sub-carrier in the second transmission frequency band B may be referred to as the "orthogonal sub-carrier set". For each sub-carrier in the orthogonal sub-carrier set, since these sub-carriers are orthogonal to each sub-carrier in the second transmission frequency band B, the second transmission frequency band B is not interfered when data is transmitted, so that the data may be directly sent to the receiving end without performing the extended modulation.

Figure 5:
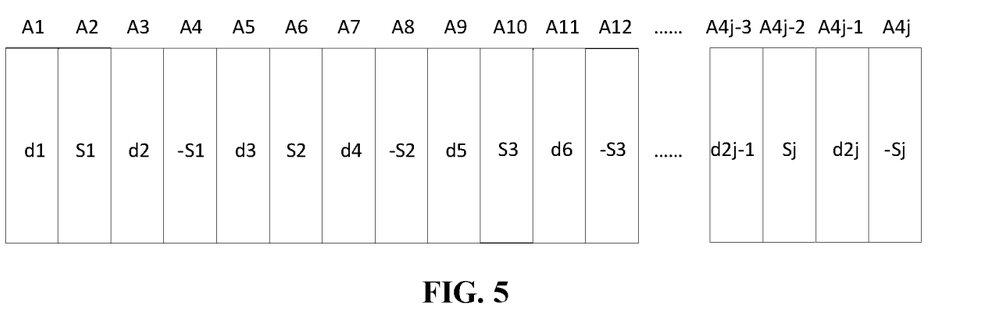
FIG. 5 is a schematic diagram of a second data sequence to be transmitted carried on each sub-carrier of the first transmission frequency band according to the embodiment one of the present disclosure.
Figure 6:
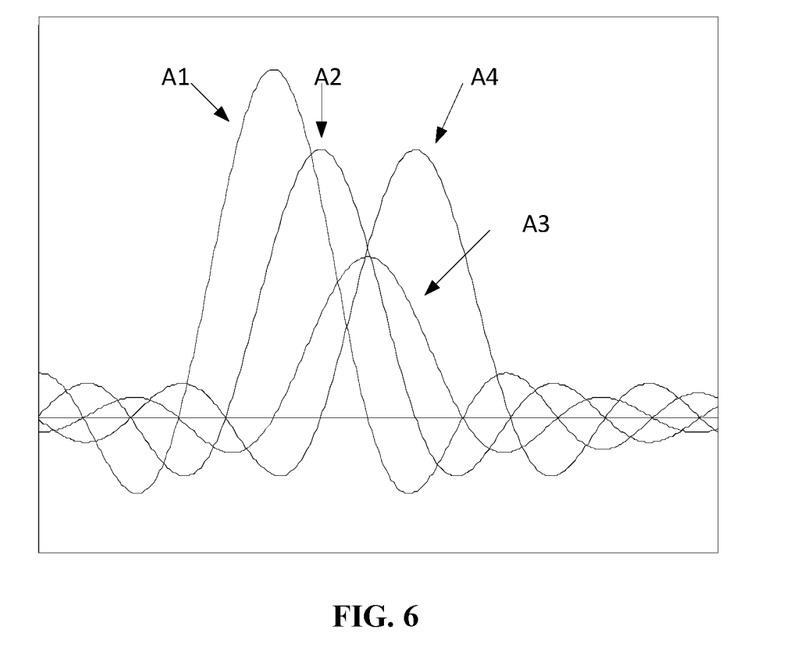
FIG. 6 is a schematic diagram of waveforms of four sub-carriers after the extended modulation is performed on the first transmission frequency band according to the embodiment one of the present disclosure.

In the above example, sub-carriers of the first transmission frequency band with an odd serial number n, such as A1, A3, A5, etc., are orthogonal to the sub-carriers of the second transmission frequency band B, therefore the sending end may directly adopt these orthogonal sub-carriers to send third data to be transmitted except the second data to be transmitted without performing the extended modulation on these third data to be transmitted. That is, data to be transmitted on a sub-carrier of the first transmission frequency band may be sent directly through this sub-carrier, a frequency difference with between this sub-carrier of the first transmission frequency band and a sub-carrier of the second transmission frequency band is equal to an integer multiple of $C_B$. Therefore, when the sub-carriers in the orthogonal sub-carrier set transmit the third data to be transmitted, one sub-carrier may directly transmit one piece of the third data to be transmitted. FIG. 5 shows a mapping relationship between the data to be transmitted in the first transmission frequency band A and sub-carriers when k is equal to 1. In FIG. 5, the sending end needs to send data with a number of 3j to the second receiving end through the first transmission frequency band A, in order to make rational use of each sub-carrier in the first transmission frequency band, the sending end may take data with a number of j (such as, S1, S2, S3 . . . and Sj) as the second data to be transmitted to perform the extended modulation. It is assumed that the value of K is 1, then the sending end will obtain j second data sequences to be transmitted, each second data sequence to be transmitted includes two pieces of extended data, such as [S1, −S1], [S2, −S2] . . . and [Sj, −Sj]. For the extended data with a number of 2j, the sending end may send the data on the spaced sub-carrier set including 2j sub-carriers. At the same time, remaining data with the number of 2j (such as, d1, d2, d3 . . . and d2j) is taken as the third data to be transmitted, which is transmitted directly on the orthogonal sub-carrier set of the first transmission frequency band A. FIG. 6 shows a schematic diagram of waveforms of each sub-carrier signal in the first transmission frequency band A when j has a value of 1, where the side lobe amplitudes of sub-carrier A2 and sub-carrier A4 are cancelled with each other, since the sub-carrier A1 and the sub-carrier A3 are orthogonal to the sub-carriers of the second transmission frequency band B, therefore sub-carrier A1 and sub-carrier A3 directly transmit the third data to be transmitted.

If a frequency offset exists between the second transmission frequency band B and the first transmission frequency band A, no sub-carrier orthogonal to the second transmission frequency band B exists in the first transmission frequency band A. In this case, any sub-carrier in the first transmission frequency band A will interfere with the second transmission frequency band B when transmitting data. In order to avoid influence on the performance of the second transmission frequency band B, the extended modulation needs to be adopted on all sub-carriers of the first transmission frequency band A, each data to be transmitted is modulated by an extended sequence, then sent on equally spaced sub-carriers with the frequency spacing of $C_B$ to each other. Taking $C_B=4C_A$ as an example, after certain data to be transmitted is modulated by the extended sequence with the length of 2, the extended data with a number of 2 is obtained. The extended data with the number of 2 is sent on the equally spaced sub-carriers with the frequency spacing of CB to each other, that is, 3 sub-carriers are spaced, such as sub-carriers A1 and A5, or A2 and A6, or A9 and A13, etc.

Figure 7:
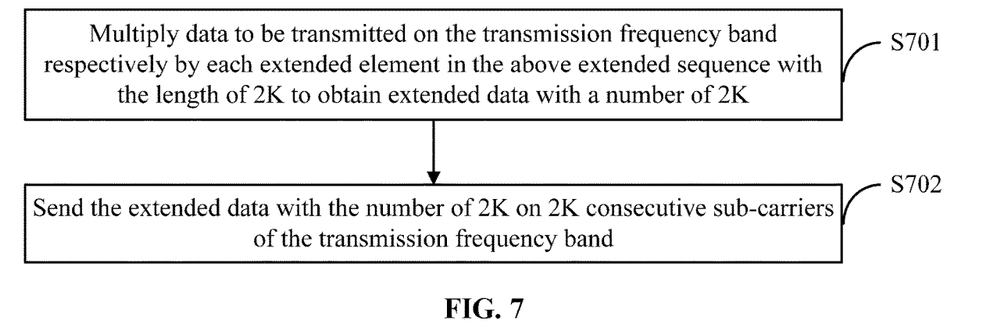
FIG. 7 is a flowchart of a single transmission frequency band sending data using an extended sequence modulation data sending rule in the embodiment one of the present disclosure.

It should be understood that the application of the data sending method in this embodiment is not limited to adjacent transmission frequency bands, and it is also applicable to a single transmission frequency band in some scenarios. For example, when the single transmission frequency band sends data by adopting the extended sequence modulation data sending rule, a process of sending the data is shown in FIG. 7, which includes steps described below.

S701, data to be transmitted on the transmission frequency band is multiplied respectively by each extended element in the above extended sequence with the length of 2K to obtain extended data with a number of 2K.

S702, the extended data with the number of 2K is sent on 2K consecutive sub-carriers of the transmission frequency band, where K is a positive integer greater than 1.

In the data sending method provided in this embodiment, the data to be transmitted is multiplied by the extended sequence with the length of 2K, the extended data with the number of 2K is obtained, and the extended data with the number of 2K is respectively sent on the 2K consecutive sub-carriers, so that the side lobe amplitudes between 2K sub-carrier signals may be greatly cancelled, the purpose of reducing the out-of-band leakage is achieved, and the interference of a signal of the target transmission frequency band on a signal of the protected frequency band is avoided, so as to ensure the transmission performance of the protected frequency band.

Furthermore, if sub-carriers orthogonal to the sub-carriers of the protected frequency band exists in the target frequency band, the data sending method provided in this embodiment will also directly adopt these orthogonal sub-carriers to send the third data to be transmitted without performing the extended modulation on the third data to be transmitted, so that spectrum efficiency of the target transmission frequency band is improved.

Embodiment Two

In this embodiment, on the basis of embodiment one, the previous data sending method will be explained in conjunction with specific examples.

It is assumed that in this embodiment, two adjacent transmission frequency bands are two adjacent sub-bands in a complete transmission frequency band, which are a second sub-band C and a first sub-band D respectively. On this complete transmission frequency band, the sending end, such as a base station, schedules the second sub-band C and the first sub-band D to send data respectively to two terminal devices, and the sending end configures a frequency spacing $C_C$ of adjacent sub-carriers for the second sub-band C to be 60 kHz and a frequency spacing $C_D$ of adjacent sub-carriers for the first sub-band D to be 15 kHz.

Under a normal condition, if the second sub-band C and the first sub-band D need to send data simultaneously, the sending end should take both the second sub-band C and the first sub-band D as the target transmission frequency bands, and the extended modulation is performed on data to be transmitted of both the second sub-band C and the first sub-band D so as to suppress the interference between the two sub-bands. However, in some examples of this embodiment, the sending end may perform the extended modulation only on any one of the two sub-bands. Please refer to FIG. 8 and FIG. 9, which respectively show a flow chart of a data sending when the second sub-band C and the first sub-band D are individually used as the target transmission frequency band.

Figure 8:
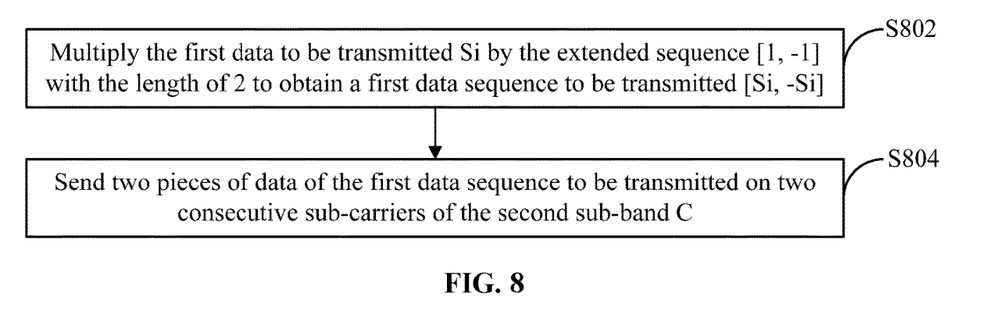
FIG. 8 is a flowchart of a data sending method according to embodiment two of the present disclosure.

S802, the first data to be transmitted Si is multiplied by an extended sequence [1, −1] with a length of 2 to obtain a first data sequence to be transmitted [Si, −Si].

In the present embodiment of the present disclosure, the extended sequence is [1, −1], so the value of K is 1. Although two extended elements in this example have a same absolute value, that is, two pieces of data obtained by performing the extended modulation have a same amplitude, but in some other examples, in order to better cancel the side lobe amplitudes of the two sub-carriers, an extended sequence with not exactly same modulus values of extended elements may be selected.

In this embodiment, a frequency spacing $C_{CD}$ between the second sub-band C and the first sub-band D adjacent to each other is 15*p kHz, which is an integer multiple of a frequency spacing $C_D$ of adjacent sub-carriers of the first sub-band D.

S804, two pieces of data of the first data sequence to be transmitted is sent on two consecutive sub-carriers of the second sub-band C.

Specifically, in this embodiment, the two pieces of data in the first data sequence to be transmitted is sent on a first sub-carrier C1 and a second sub-carrier C2 of the second sub-band C.

Figure 9:
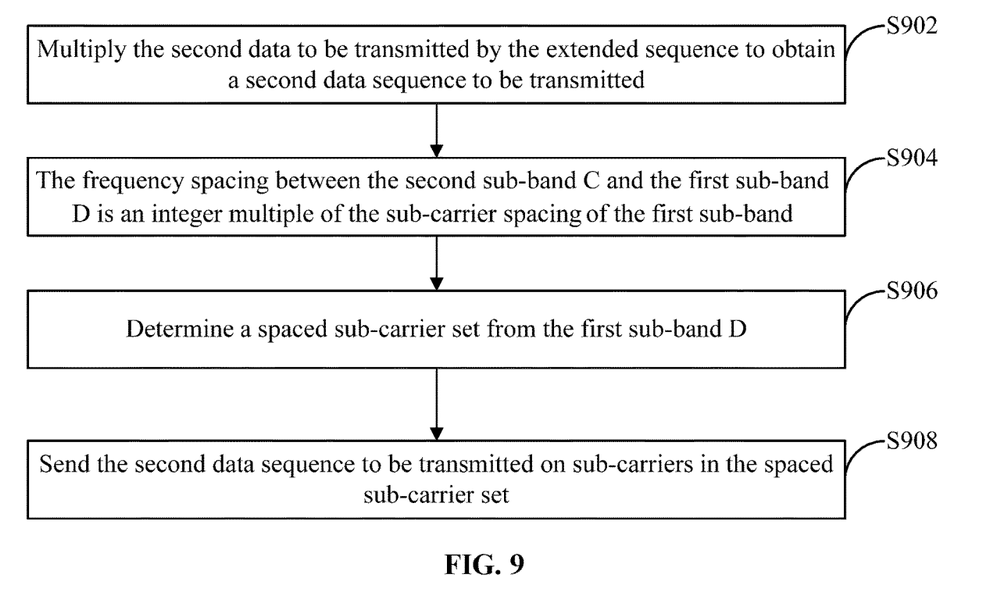
FIG. 9 is another flowchart of the data sending method according to the embodiment two of the present disclosure.

In another example, the sending end performs the extended modulation on data which needs to be transmitted on spaced sub-carriers of the first sub-band D, i.e., second data to be transmitted, that is, the sending end selects the first sub-band D as the target transmission frequency band, and a process of sending the data please refer to FIG. 9.

S902, the second data to be transmitted is multiplied by the extended sequence to obtain a second data sequence to be transmitted.

Whether the second sub-band C is selected as the target transmission frequency band or the first sub-band is selected as the target transmission frequency band, that is, whether the extended modulation is performed on the first data to be transmitted is selected or the extended modulation is performed on the second data to be transmitted is selected, in this embodiment, processes of the extended modulation are similar. Therefore, the specific extended modulation process may be referred to the explanation of embodiment one and the previous modulation process of the first data to be transmitted Si, which will not be repeated here again.

However, it may be understood that, among two schemes of selecting the second sub-band C or the first sub-band D as the target transmission frequency band, the extended sequence adopted may be different, which specifically may be embodied in different modulus values of extended elements in the extended sequence, or different lengths of the extended sequence, etc.

S904, the frequency spacing $C_{CD}$ between the second sub-band C and the first sub-band D is an integer multiple of the sub-carrier spacing $C_D$ of the first sub-band D.

Since $C_{CD}$ is equal to 15*p kHz, and p is an integer in this embodiment, so it is determined that the frequency spacing between the second sub-band C and the first sub-band D is an integer multiple of the frequency spacing of adjacent sub-carriers of the first sub-band. In this case, it may be considered that no frequency offset exists between the second sub-band C and the first sub-band D. No frequency offset means that a part of the sub-carriers in the first sub-band D are orthogonal to the sub-carriers of the second sub-band C.

S906, a spaced sub-carrier set is determined from the first sub-band D.

As it may be seen from the description of embodiment one, the first sub-band D includes one or more spaced sub-carrier sets, each spaced sub-carrier set includes sub-carriers having a frequency difference with the second sub-band C unequal to an integer multiple of $C_D$, and the frequency spacing of adjacent sub-carriers in the spaced sub-carrier set is $C_D$. Since $C_C$ is 60 kHz and $C_D$ is 15 kHz, so m is equal to 4, and the first sub-band D includes 3 spaced sub-carrier sets. It is assumed that p in this embodiment is 3, then $C_{CD}$ is 15 kHz, so sub-carriers 1, 5, 9, 13 . . . and 4L−3 form a first spaced sub-carrier set, and sub-carriers 2, 6, 10, 14 . . . and 4L−2 form a second spaced sub-carrier set, and sub-carriers 3, 7, 11, 15 . . . and 4L−1 form a third spaced sub-carrier set.

S908, the second data sequence to be transmitted is sent on the sub-carriers in the spaced sub-carrier set.

In this embodiment, it is assumed that the extended sequence is [1, −1], when there is data to be transmitted with a number of j [S1, S2, S3, . . . , Sj] on sub-carriers of the first spaced sub-carrier set, the data to be transmitted with the number of j are respectively multiplied by the extended sequence [1, −1] to obtain j groups of extended data, such as [S1, −S1], [S2, −S2] . . . and [Sj, −Sj]. In the first spaced sub-carrier set, two sub-carriers are taken as a group successively, and the j groups of extended data are sent on j groups of sub-carriers respectively. Specifically, [S1, −S1] is sent on sub-carriers 1 and 5, [S2, −S2] is sent on sub-carriers 9 and 13, and [S3, −S3] is sent on sub-carriers 17 and 21, . . . and so on.

Similarly, when there is data to be transmitted with a number of j such as [Sj+1, Sj+2. Sj+3 . . . S2j] on sub-carriers of the second spaced sub-carrier set, the data to be transmitted with the number of j are respectively multiplied by the extended sequence [1, −1] to obtain j groups of extended data, such as [Sj+1, −Sj+1], [Sj+2, −Sj+2] . . . [S2j, −S2j]. In the second spaced sub-carrier set, two sub-carriers are taken as a group successively, and the j groups of extended data are sent on j group of sub-carriers respectively. Specifically, [Sj+1, −Sj+1] is sent on sub-carriers 2 and 6, [Sj+2, −Sj+2] is sent on sub-carriers 10 and 14, and [Sj+3, −Sj+3] is sent on sub-carriers 18 and 22, . . . and so on.

Similarly, when there is data to be transmitted with a number of j [S2j+1, S2j+2, S2j+3 . . . S3j] on sub-carriers of the third spaced sub-carrier set, the data to be transmitted with the number of j are respectively multiplied by the extended sequence [1, −1] to obtain j groups of extended data [S2j+1, −S2j+1], [S2j+2, −S2j+2] . . . [S3j, −S3j]. In the third spaced sub-carrier set, two sub-carriers are taken as a group successively, and the j groups of extended data are sent on j group of sub-carriers respectively. Specifically, [S2j+1, −S2j+1] is sent on sub-carriers 3 and 7, [S2j+2, −S2j+2] is sent on sub-carriers 11 and 15, and [S2j+3, −S2j+3] is sent on sub-carriers 19 and 23, . . . and so on.

Further, on sub-carriers 4, 8, 12, 16, . . . and 4L of the first sub-band D, corresponding data to be transmitted is directly sent on these sub-carriers without multiplying the extended sequence.

It may be understood that the processes of FIGS. 8 and 9 may be performed simultaneously, and in most cases, in order to ensure the respective transmission performance of two adjacent sub-bands, the sending end may select the second sub-band C and the first sub-band D as the target transmission frequency bands simultaneously, processes shown in FIG. 8 and FIG. 9 are simultaneously executed to realize data sending.

In the data sending method provided in this embodiment, when the first sub-band with a small frequency spacing of adjacent sub-carriers is selected as the target transmission frequency band, the extended modulation is performed on sub-carriers which are not orthogonal to the sub-carriers of the second sub-band, so that side lobe amplitudes of each sub-carrier signal are mutually cancelled, the out-of-band leakage of the first sub-band is suppressed, and the interference of the first sub-band on the second sub-band is reduced. Meanwhile, for orthogonal sub-carriers which are orthogonal to each sub-carrier of the second sub-band, data is directly transmitted without performing the extended modulation, so that spectrum resources are saved and the spectrum efficiency is improved.

Embodiment Three

The out-of-band leakage of an OFDM system is relatively large, so that a section of frequency is always reserved between adjacent transmission frequency bands to serve as a guard spacing for reducing interference of the out-of-band leakage on an adjacent frequency band. In this way, it will inevitably cause a waste of frequency resources to a certain extent, and spectrum utilization efficiency is reduced. How to increase the spectrum utilization of this guard spacing band? To this end, an embodiment of the present disclosure proposes a data sending method that can effectively reduce the out-of-band leakage and suppress the interference between adjacent frequency bands, please refer to FIG. 10.

In this embodiment, the target transmission frequency band may be any transmission frequency band. As long as requirements on suppressing the out-of-band leakage exist, reference may be made to following example during a data transmission.

Figure 10:
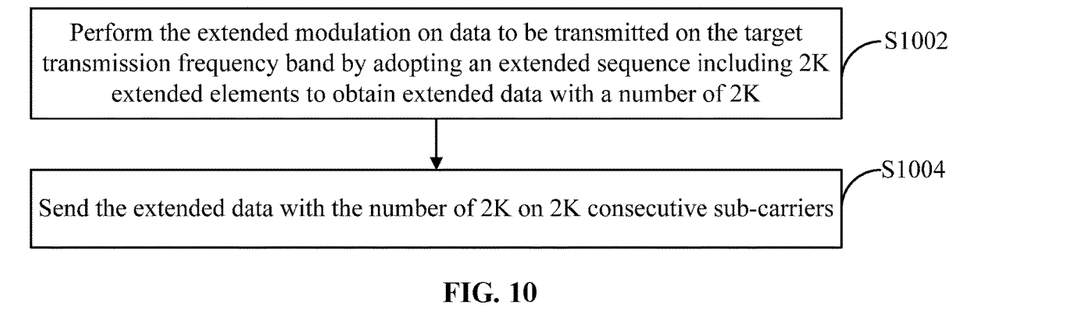
FIG. 10 is a flowchart of a data sending method provided according to embodiment three of the present disclosure.

S1002, the extended modulation is performed on data to be transmitted on the target transmission frequency band by adopting an extended sequence including 2K extended elements to obtain extended data with a number of 2K.

In the embodiments of the present disclosure, the transmission frequency band is a section of frequency resources for transmitting data. The transmission frequency band includes N sub-carriers, and N is greater than or equal to 2. The transmission frequency band may be a complete transmission broadband, or a transmission sub-band on the transmission broadband, or a part of frequency resources of the transmission sub-band, and so on.

In this embodiment, the data to be transmitted may be digital modulation information. such as a BPSK, a QPSK, or a QAM, and may also be in other data formats, which is collectively referred to as the data to be transmitted.

In this embodiment, K is a positive integer, in some examples of this embodiment, K is greater than or equal to 2. Similar to the previous embodiments, every two consecutive elements of the extended sequence form a suppression group, two extended elements within a same suppression group have the phase difference of $\pi$, and adjacent extended elements between groups have the phase difference of 0 or $\pi$. That is, a $1^{st}$ extended element and a $2^{nd}$ extended element in the extended sequence form a suppression group, a $3^{rd}$ extended element and a $4^{th}$ extended element form a suppression group, . . . a $(2K-1)^{th}$ extended element and a $(2K)^{th}$ extended element form a suppression group, a phase difference between the $2^{nd}$ extended element and the $3^{rd}$ extended element in the extended sequence is 0 or $\pi$, and a phase difference between the $4^{th}$ extended element and the $5^{th}$ extended elements is 0 or $\pi$, and so on.

In one specific example of this embodiment, when K is equal to 1, the extended sequence is [P, −P]; when K is equal to 2, the extended sequence includes [P, −P, −P, P], where P is a complex number, and it should be understood that P may be specifically set to be a real number or an imaginary number according to actual requirements.

In the above example, each extended element in the extended sequence has an equal absolute value, which is P. It should be understood that a modulus value of each extended element will influence an amplitude of the data to be transmitted after performing the extended modulation. Therefore, each extended element in the extended sequence may have a not completely equal modulus value. For example, when the value of K is 1, modulus values of the two elements of the extended sequence may not be equal; when the value of K is 2, extended elements with unequal modulus values may exist in the extended sequence.

The extended sequence in this embodiment is similar to that in each of the previous embodiments, and the modulation manner may also refer to the explanation of the previous embodiments, which is not to be repeated again.

S1004, the extended data with the number of 2K is sent on 2K consecutive sub-carriers.

After the sending end performs the extended modulation on the data to be transmitted to obtain the data sequence to be transmitted, the extended data with the number of 2K may be sequentially mapped onto the 2K consecutive sub-carriers of the target transmission frequency band. It should be understood that in some other examples, the sending end may also select spaced sub-carriers for sending the data. When the spaced sub-carriers for transmitting the data sequence to be transmitted are selected, the sending end should ensure that each selected sub-carrier spacing is the same.

It is worth mentioned that the above method steps of this embodiment are directed to a processing process of a single piece of data to be transmitted. When the data to be transmitted has a plural number, for example, there is data to be transmitted with a number of j at present, and j is an integer greater than 1, one manner of sending the data to be transmitted at this time is to respectively multiply the data to be transmitted with the number of j by the extended sequence to obtain j groups of data sequences to be transmitted (each data sequence to be transmitted includes the extended data with the number of 2K). Then, the 2K consecutive sub-carriers are taken as a group successively on the target transmission frequency band, and the j groups of data sequences to be transmitted are sent on j groups of consecutive sub-carriers respectively.

According to the data sending method provided in this embodiment, the data to be transmitted is multiplied by the extended sequence with the length of 2K to obtain the extended data with the number of 2K, and the extended data with the number of 2K is respectively sent on the 2K consecutive sub-carriers respectively, so that the side lobe amplitudes between 2K sub-carrier signals may be greatly cancelled, the purpose of reducing the out-of-band leakage is achieved, moreover, the signal-to-noise ratio may be increased by repeatedly sending the data under the action of the extended sequence, so that the demodulation performance is improved.

Embodiment Four

In this embodiment, a data sending method is provided. This embodiment is a specific implementation of the data sending method described in embodiment three. Specifically, please refer to FIG. 11, in this figure, the second transmission frequency band B adopting the data extended modulation sending rule is taken as an example, i.e., the second transmission frequency band B is taken as the target transmission frequency band.

Figure 11:
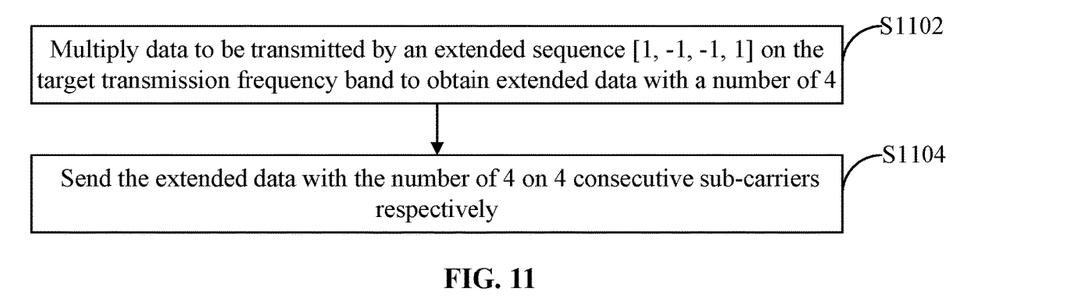
FIG. 11 is a flowchart of a data sending method according to embodiment four of the present disclosure.

S1102, data to be transmitted is multiplied by an extended sequence [1, −1, −1, 1] on the target transmission frequency band to obtain extended data with a number of 4.

In this embodiment, the target transmission frequency band is a section of frequency resource for transmitting data. The target transmission frequency band includes N sub-carriers, and N is greater than or equal to 2. The transmission frequency band may be a complete transmission broadband, or a transmission sub-band on the transmission broadband, or a part of frequency resources of the transmission sub-band, and so on.

S1104, the extended data with the number of 4 is sent on 4 consecutive sub-carriers respectively.

In a specific example of this embodiment, when there is data to be transmitted with a number of K ([S1, S2, S3, . . . SK]) on the transmission frequency band, the data to be transmitted with the number of K ([S1, S2, S3, . . . SK]) are respectively multiplied by the extended sequence [1, −1, −1, 1] to obtain K data sequences to be transmitted ([S1, −S1, −S1, S1], [S2, −S2, −S2, S2] . . . and [SK, −SK, −SK, SK]). Where 4 consecutive sub-carriers form a group, and the K data sequences to be transmitted are sent on K consecutive groups of sub-carriers respectively, that is, [S1, −S1, −S1, S1] is sent on sub-carriers 1, 2, 3 and 4, [S2, −S2, −S2, S2] is sent on sub-carriers 5, 6, 7 and 8, . . . and [SK, −SK, −SK, SK] is sent on sub-carriers 4K−3, 4K−2, 4K−1 and 4K.

In this embodiment, the extended sequence [1, −1, −1, 1] achieves the effect of suppressing the out-of-band leakage through the side lobe cancellation of 4 consecutive sub-carrier signals, and the out-of-band leakage suppression effect is better than that of the extended sequence [1, −1]. Moreover, the data is repeatedly sent under the action of the extended sequence [1, −1, −1, 1], so that the received signal-to-noise ratio may be increased by 4 times at most.

Embodiment Five

Figure 12:
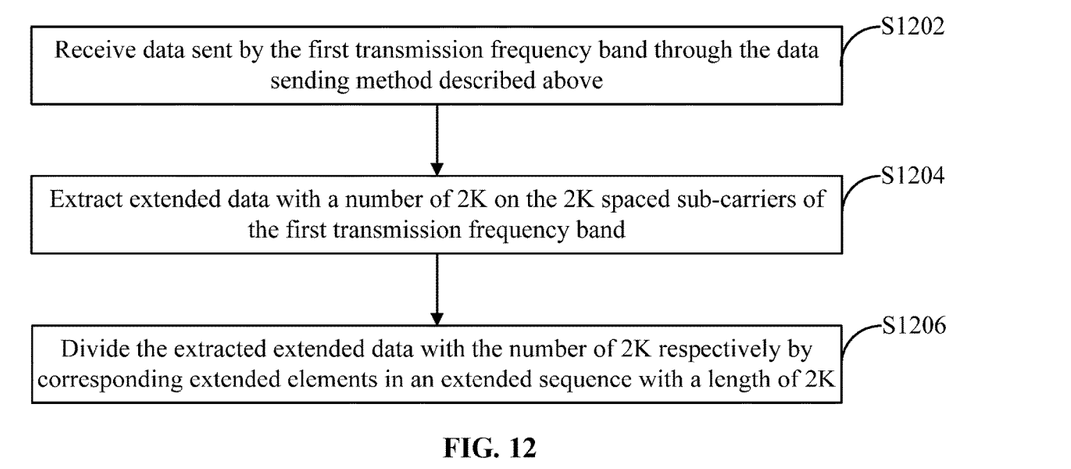
FIG. 12 is a flowchart of a data receiving method according to embodiment five of the present disclosure.

This embodiment first provides a data receiving method, please refer to FIG. 12, the data receiving method includes steps described below.

S1202, data sent by the first transmission frequency band through the data sending method described above is received.

S1204, extended data with a number of 2K on the 2K spaced sub-carriers of the first transmission frequency band is extracted.

S1206, the extracted extended data with the number of 2K is respectively divided by corresponding extended elements in an extended sequence with a length of 2K to obtain original data with a number of 2K. After a receiving end acquires the original data with the number of 2K, the receiving end demodulates the received information with a number of 2K according to the extended sequence, thereby obtaining target data. It should be understood that the demodulation process of the receiving end is inverse to the extended modulation process of the sending end, so that the extended sequence used by the demodulation of the receiving end should be the same as the extended sequence used by the extended modulation of the sending end.

This embodiment provides a computer readable storage medium. The computer readable storage medium stores one or more computer programs that may be read, compiled, or executed by a memory, the one or more computer programs include a data sending program, which is executable by a processor to implement the data sending method provided by the previous embodiments. Alternatively, the above computer readable storage medium may store a data receiving program, which is executable by the processor to implement the data receiving method described above. Of course, in an example of this embodiment, the computer readable storage medium may store both the data sending program and the data receiving program at the same time.

Meanwhile, this embodiment further provides a data transmission device. The data transmission device may be used as a data sending device, of course, may also be used as a data receiving device, or may be used as both the data sending device and the receiving device at the same time, please refer to FIG. 13. The data transmission device includes a processor 131, a memory 132 and a communication bus 133 configured to connect the processor 131 and the memory 132. The memory 132 may be the aforementioned computer readable storage medium storing the data sending program or the computer readable storage medium storing the data receiving program. Therefore, the data transmission device provided in this embodiment may be used as the data sending end to execute the data sending methods in the previous embodiments, and may also be used as the data receiving end to execute the data receiving methods in the previous embodiments.

Figure 14:
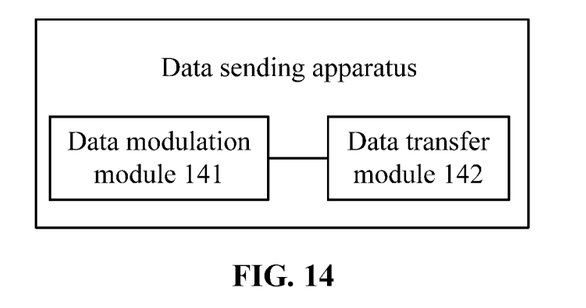
FIG. 14 is a schematic structural diagram of a data sending apparatus according to the embodiment five of the present disclosure.

This embodiment also provides a data sending apparatus, as shown in FIG. 14, the data sending apparatus includes a data modulation module 141 and a data transfer module 142.

The data modulation module 141 is configured to, when a first transmission frequency band sends data by adopting an extended sequence modulation data sending rule, multiply data to be transmitted on the first transmission frequency band respectively by each extended element in an extended sequence with a length of 2K to obtain extended data with a number of 2K, where there is another extended element with a phase difference of $\pi$ relative to each extended element in the extended sequence.

The data transfer module 142 is configured to send the extended data with the number of 2K on 2K spaced sub-carriers of the first transmission frequency band, where m and K are positive integers.

It should be understood that, in this embodiment, the data modulation module 141 may also determine that the first transmission frequency band sends data by adopting the extended sequence modulation data sending rule when the relationship between the sub-carrier spacing $C_A$ of the first transmission frequency band and the sub-carrier $C_B$ of the second transmission frequency band satisfies the following formula: $C_B = m \cdot C_A$. Moreover, the functions of the data modulation module 141 and the data transfer module 142 may be implemented by a processor, such as the processor shown in FIG. 13. A specific data modulation process of the data modulation module 141 and a specific process of sending data by the data transfer module 142 refer to the methods in the various embodiments described above, which are not to be repeated herein again.

However, it should be understood that the data modulation module 141 and the data transfer module 142 in this embodiment may also implement sending data on the first transmission frequency band by adopting the methods shown in the various embodiments described above.

Figure 15:
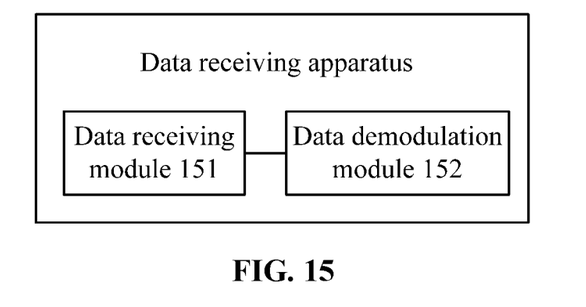
FIG. 15 is a schematic structural diagram of a data receiving apparatus according to the embodiment five of the present disclosure.

This embodiment provides a data receiving apparatus, as shown in FIG. 15, the data receiving apparatus includes a data receiving module 151 and a data demodulation module 152.

The data receiving module 151 is configured to receive data sent by a first transmission frequency band through the data sending method described above and extract extended data with a number of 2K on the 2K spaced sub-carriers of the first transmission frequency band.

The data demodulation module 152 is configured to divide the extracted and extended data with the number of 2K respectively by corresponding extended elements in the extended sequence with the length of 2K.

Figure 13:
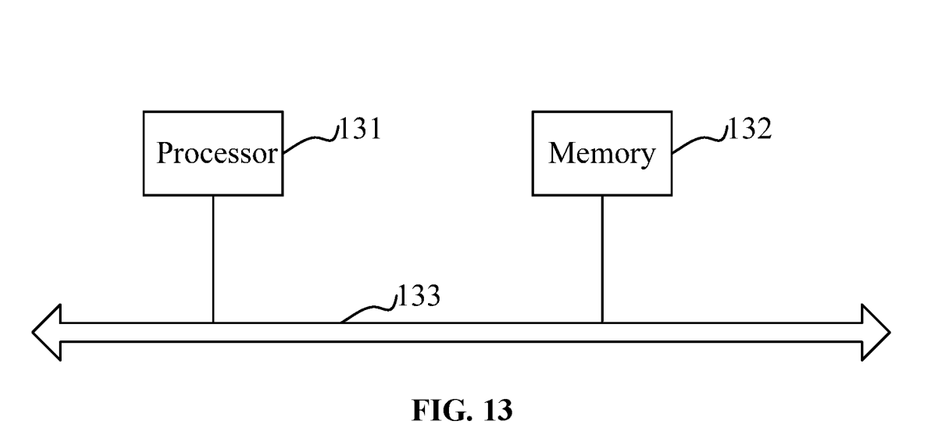
FIG. 13 is a schematic structural diagram of a data transmission device according to the embodiment five of the present disclosure.

It should be understood that functions of the data receiving module 151 and the data demodulation module 152 in this embodiment may also be implemented by a processor, such as the processor shown in FIG. 13. The specific data demodulation process of the data demodulation module 152 refers to the methods in the various embodiments described above, which is not to be repeated herein again. However, it should be understood that the data receiving module 151 and the data demodulation module 152 in this embodiment may also implement reception and demodulation of data on the second transmission frequency band by adopting the methods shown in the various embodiments described above.

This embodiment provides a data receiving method, a computer readable storage medium, and a data transmission device. When the data transmission device is used as the sending end, through the extended modulation performed on the data to be transmitted corresponding to the target transmission frequency band, so when the target transmission frequency band transmits the data sequence to be transmitted, the side lobe amplitudes of the sub-carriers may cancelled with each other, thereby the out-of-band leakage of the target transmission frequency band is suppressed, interference of signals of the target transmission frequency band on signals of the protected frequency band is avoided, furthermore, the transmission performance of the protected frequency band is ensured. Meanwhile, under the action of the extended sequence, same data to be transmitted may be sent repeatedly, so that the received signal-to-noise ratio of the transmission frequency band subjected to the sequence extended is increased, thereby improving the demodulation performance thereof. Apparently, those skilled in the art should understand that modules or steps of the embodiments of the present disclosure described above may be implemented with a general-purpose computing apparatus, and they may be concentrated on a single computing apparatus, or distributed over the network composed of multiple computing apparatuses, they may be implemented through a program code executable by the computing apparatus, so that they may be stored in a computer storage medium (a read only memory (ROM)/random access memory (RAM), a magnetic disk, an optical disk) and executed by the computing apparatus, and in some cases, they may be implemented through steps shown or described performed in an order different from that herein, or separately fabricating them as individual integrated circuit modules, or fabricating multiple modules or steps thereof as a single integrated circuit module. Accordingly, the present disclosure is not limited to a combination of any particular hardware and software.

The above contents are further detailed descriptions of the embodiments of the present disclosure in conjunction with specific implementations, and it cannot be assumed that specific implementations of the present disclosure are limited to these descriptions. For those of ordinary skill in the technical field to which the present disclosure belongs, some simple deductions or replacements may be made without departing from the concept of the present disclosure, which should be regarded as falling within the protection scope of the present disclosure.

What is claimed is:

1. A method for sending of orthogonal frequency multiplexing (OFDM) signals using an extended sequence, comprising:

determining, by a sending end, that a relationship between a sub-carrier spacing $C_A$ of a first transmission frequency band and a sub-carrier spacing $C_B$ of a second transmission frequency band adjacent to the first transmission frequency band satisfies the following formula: $C_B = m \cdot C_A$;

in a case where data is sent on the first transmission frequency band by adopting an extended sequence modulation data sending rule, multiplying, by the sending end, the data to be transmitted on spaced sub-carriers of the first transmission frequency band respectively by each extended element in the extended sequence with a length of 2K to obtain extended data with a number of 2K, wherein there is another extended element with a phase difference of π relative to each extended element in the extended sequence; and sending, by the sending end, the extended data with the number of 2K on 2K spaced sub-carriers of the spaced sub-carriers of the first transmission frequency band;

wherein the 2K spaced sub-carriers are sub-carriers with an equal spacing, and sub-carriers spaced between adjacent spaced sub-carriers in the 2K spaced sub-carriers have a number of m−1, m is an integer greater than 1, and K is a positive integer; and wherein every two consecutive extended elements in the extended sequence form a group, and two extended elements within the group have a phase difference of π.

2. The method of claim 1, wherein:

in a case where K is equal to 1, the extended sequence comprises [P, −P]; or, in a case where K is equal to 2, the extended sequence comprises [P, −P, −P, P];

wherein P is a complex number.

3. The method of claim 1, wherein a difference between a frequency of one of the spaced sub-carriers of the first transmission frequency band and a frequency of a sub-carrier of the second transmission frequency band is not equal to an integer multiple of $C_B$.

4. The method of claim 1, further comprising:

sending, by the sending end, data to be transmitted on a sub-carrier of the first transmission frequency band, wherein a frequency difference between the sub-carrier of the first transmission frequency band and a sub-carrier of the second transmission frequency band is equal to an integer multiple of $C_B$.

5. The method of claim 1, wherein, in a case where the second transmission frequency band sends data by adopting the extended sequence modulation data sending rule, a process of sending the data on the second transmission frequency band comprises:

multiplying, by the sending end, the data to be transmitted on the second transmission frequency band respectively by each extended element in an extended sequence with a length of 2L to obtain extended data with a number of 2L, wherein there is another extended element with a phase difference of π relative to each extended element in the extended sequence with the length of 2L, and L is a positive integer; and sending, by the sending end, the extended data with the number of 2L on 2L consecutive sub-carriers of the second transmission frequency band.

6. A method for receiving of orthogonal frequency multiplexing (OFDM) signals using an extended sequence, comprising:

in response to determining that a relationship between a sub-carrier spacing $C_A$ of a first transmission frequency band and a sub-carrier spacing $C_B$ of a second transmission frequency band adjacent to the first transmission frequency band satisfies the following formula: $C_B = m \cdot C_A$, receiving, by a receiving end, data sent on the first transmission frequency band;

extracting, by the receiving end, from the received data, extended data with a number of 2K on 2K spaced sub-carriers of the first transmission frequency band; and dividing, by the receiving end, the extracted and extended data with the number of 2K respectively by corresponding extended elements in the extended sequence with a length of 2K; wherein there is another extended element with a phase difference of π relative to each extended element in the extended sequence, the 2K spaced sub-carriers are sub-carriers with an equal spacing, and sub-carriers spaced between adjacent spaced sub-carriers in the 2K spaced sub-carriers have a number of m−1, m is an integer greater than 1, and K is a positive integer; and wherein every two consecutive extended elements in the extended sequence form a group, and two extended elements within the group have a phase difference of π.

7. An apparatus for sending of orthogonal frequency multiplexing (OFDM) signals using an extended sequence, comprising: a processor and a memory, wherein the processor is configured to execute a program stored in the memory to implement the following steps:

determining that a relationship between a sub-carrier spacing $C_A$ of a first transmission frequency band and a sub-carrier spacing $C_B$ of a second transmission frequency band adjacent to the first transmission frequency band satisfies the following formula: $C_B = m \cdot C_A$;

in a case where data is sent on the first transmission frequency band by adopting an extended sequence modulation data sending rule, multiplying the data to be transmitted on spaced sub-carriers of the first transmission frequency band respectively by each extended element in the extended sequence with a length of 2K to obtain extended data with a number of 2K, wherein there is another extended element with a phase difference of π relative to each extended element in the extended sequence; and sending the extended data with the number of 2K on 2K spaced sub-carriers of the spaced sub-carriers of the first transmission frequency band;

wherein the 2K spaced sub-carriers are sub-carriers with an equal spacing, and sub-carriers spaced between adjacent spaced sub-carriers in the 2K spaced sub-carriers have a number of m−1, m is an integer greater than 1, and K is a positive integer; and wherein every two consecutive extended elements in the extended sequence form a group, and two extended elements within the group have a phase difference of π.

8. The method of claim 2, wherein a difference between a frequency of one of the spaced sub-carriers of the first transmission frequency band and a frequency of a sub-carrier of the second transmission frequency band is not equal to an integer multiple of $C_B$.

9. The method of claim 2, further comprising:

sending, by the sending end, data to be transmitted on a sub-carrier of the first transmission frequency band, wherein a frequency difference between the sub-carrier of the first transmission frequency band and a sub-carrier of the second transmission frequency band is equal to an integer multiple of $C_B$.

10. The method of claim 2, wherein, in a case where the second transmission frequency band sends data by adopting the extended sequence modulation data sending rule, a process of sending the data on the second transmission frequency band comprises:

multiplying, by the sending end, data to be transmitted on the second transmission frequency band respectively by each extended element in an extended sequence with a length of 2L to obtain extended data with a number of 2L, wherein there is another extended element with a phase difference of π relative to each extended element in the extended sequence with the length of 2L, and L is a positive integer; and sending, by the sending end, the extended data with the number of 2L on 2L consecutive sub-carriers of the second transmission frequency band.

* * * * *